(12) United States Patent
Eliason et al.

(10) Patent No.: US 7,693,978 B2
(45) Date of Patent: Apr. 6, 2010

(54) DISTRIBUTING LIVE PERFORMANCES

(75) Inventors: Brett Eliason, North Bend, WA (US); Erik Windell, Bellevue, WA (US)

(73) Assignee: EB Technologies, LLC, Seattle, WA (US)

( * ) Notice: Subject to any disclaimer, the term of this patent is extended or adjusted under 35 U.S.C. 154(b) by 44 days.

(21) Appl. No.: 11/185,630

(22) Filed: Jul. 19, 2005

(65) Prior Publication Data

US 2007/0022055 A1    Jan. 25, 2007

(51) Int. Cl.
*G06F 15/173* (2006.01)
*H04L 9/00* (2006.01)

(52) U.S. Cl. ..................................... 709/223; 340/572.1
(58) Field of Classification Search .................... 705/1; 709/231, 223, 203; 725/80, 110, 86; 714/18
See application file for complete search history.

(56) References Cited

U.S. PATENT DOCUMENTS

| | | | | |
|---|---|---|---|---|
| 6,185,414 | B1 * | 2/2001 | Brunner et al. | 455/406 |
| 6,886,029 | B1 * | 4/2005 | Pecus et al. | 709/203 |
| 7,237,017 | B1 * | 6/2007 | Pecus et al. | 709/223 |
| 2002/0010641 | A1 * | 1/2002 | Stevens et al. | 705/26 |
| 2002/0091848 | A1 * | 7/2002 | Agresta et al. | 709/231 |
| 2002/0198846 | A1 | 12/2002 | Lao | |
| 2003/0076963 | A1 * | 4/2003 | Wells | 381/1 |
| 2003/0084451 | A1 * | 5/2003 | Pierzga et al. | 725/47 |
| 2003/0110503 | A1 * | 6/2003 | Perkes | 725/86 |
| 2003/0236581 | A1 * | 12/2003 | Chambers et al. | 700/94 |
| 2004/0002305 | A1 | 1/2004 | Byman-Kivivuori | |
| 2004/0031056 | A1 * | 2/2004 | Wolff | 725/110 |
| 2004/0031058 | A1 * | 2/2004 | Reisman | 725/112 |
| 2004/0075675 | A1 | 4/2004 | Raivisto | |
| 2004/0093281 | A1 * | 5/2004 | Silverstein et al. | 705/26 |
| 2004/0116118 | A1 * | 6/2004 | Karaoguz et al. | 455/432.3 |
| 2004/0153767 | A1 * | 8/2004 | Dolgonos | 714/18 |
| 2004/0159216 | A1 * | 8/2004 | Davis et al. | 84/609 |
| 2004/0264917 | A1 * | 12/2004 | Braun et al. | 386/46 |
| 2004/0267390 | A1 * | 12/2004 | Ben-Yaacov et al. | 700/94 |
| 2005/0004968 | A1 * | 1/2005 | Mononen et al. | 709/200 |
| 2005/0192820 | A1 * | 9/2005 | Simon et al. | 705/1 |
| 2005/0193421 | A1 * | 9/2005 | Cragun | 725/80 |
| 2006/0047603 | A1 | 3/2006 | Fontijn | |
| 2006/0200541 | A1 * | 9/2006 | Wikman et al. | 709/223 |

FOREIGN PATENT DOCUMENTS

KR    10-2003-0061914 A    7/2003

OTHER PUBLICATIONS

"MobiTV to Offer Audio and Video Baseball Coverage"—Wireless News. Coventry: Mar. 14, 2005. p. 1.*

(Continued)

*Primary Examiner*—Evens J Augustin
(74) *Attorney, Agent, or Firm*—Christensen O'Connor Johnson Kindness PLLC

(57) ABSTRACT

An audio codec uses one or more access points to broadcast or unicast a performance to a mobile digital media device that is registered and therefore is authorized to receive the performance. Prior to receiving, the mobile digital media device is authenticated by replying to an RFID query from one or more access points. If the mobile digital media device is registered, a secure key is sent to the mobile digital media device. The mobile digital media device uses the secure key to decrypt music being broadcasted or unicasted to receive the distribution of the live performances in the music venue.

17 Claims, 14 Drawing Sheets

OTHER PUBLICATIONS

"MobiTV Celebrates First Anniversary of Delivering Live TV to Cell Phones"—Business Wire. New York: Dec. 2, 2004. p. 1.*

Broadcasting digital content on mobile; [Computimes, 2* Edition] Hazimin Sulaiman. New Straits Times. Kuala Lumpur: Jun. 16, 2005. p. 11.*

* cited by examiner

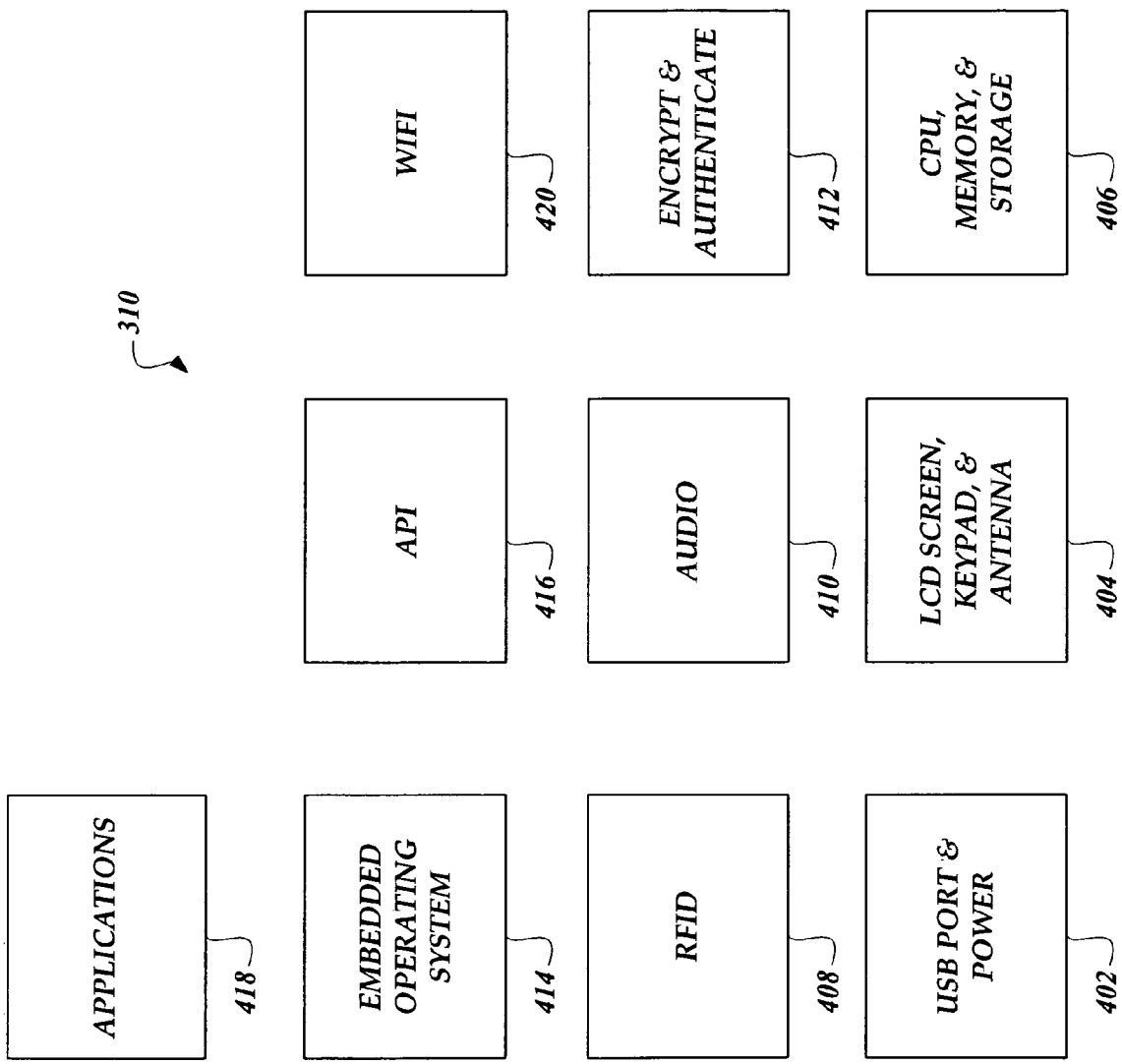

DISTRIBUTING LIVE PERFORMANCES

FIELD OF THE INVENTION

The present invention relates generally to media distribution, and more particularly, to distributing live media, such as music or lectures, to registered members of the audience within a venue.

BACKGROUND OF THE INVENTION

Country music is derived from or imitates the folk style of the southern U.S. or of the Western cowboy. Folk songs, on which country music is based, are traditional songs that are typically characterized by stanzaic form, refrain, and simplicity of melody. Blues are songs of lamentation usually characterized by 12-bar phrases and 3-line stanzas in which the words of the second line usually repeat those of the first, as well as the continual occurrence of blue notes in melody and harmony. Rock often incorporates elements of country, folk, and blues to compose popular music usually played on electronically amplified instruments and characterized by a heavily accented beat and much repetition of simple phrases.

There are many music venues, such as the gentle green slope of a city's park, a sports stadium, or a smoky bar, in which music from these genres is performed live before an audience. Unlike a studio where quality audio recordings can be properly made, often these live performances are recorded by a fan's tape recorder, which bootleg recording is typically of poor condition and illegal. Even if these live performances were recorded by better instruments, however, they would typically not be immediately available for members of the audience to legally purchase and pick up. Often, it takes days after a live performance for which members of the audience have ordered the music for a compact disc to arrive in the mail. However, FIG. 1 illustrates an instance 100 where recordings of live performances can be made available after only 20 to 30 minutes to members of the audience.

While a live performance is given at the music venue 102, one or more microphones placed at the music venue transmit the speech and music from the live performance to a truck 106 or other facilities within proximity to the music venue 102. There are recording devices on the truck 106 or other facilities to record the speech and music as picked up by the microphones. The speech and music are burned onto a compact disc 108, which is an optical storage medium for digital data, usually audio.

Today many people are downloading music in digital form to their computer over the Internet using popular Web sites, such as iTunes® from Apple Computer, Inc. The major problem with the Internet is the difficulty of ensuring that only authorized individuals are allowed to download music. Without resolution to the problem of obtaining high quality media from live performances, such as music, that can be taken away as a memento of the experience, users may resort to tape recording live performances without authorization and organizations may forgo digital media distribution, causing demand for legal copies to diminish in the marketplace. Thus, there is a need for a system, method, and computer-readable medium for distributing live performances while avoiding or reducing the foregoing and other problems associated with existing systems.

SUMMARY OF THE INVENTION

In accordance with this invention, a system and method for distributing music is provided. The system form of the invention includes a system for digitally distributing live performances, which comprises a mobile digital media device capable of emitting radio frequency identification information and communicating over a wireless local area network. The system further comprises a live music distribution system for distributing live performances to the mobile digital media device over the wireless local area network when the presence of the mobile digital media device is detected by the emitted radio frequency identification information and the mobile digital media device is registered to receive the distribution of live performances at a venue. The live performances include music, a lecture, an audio drama, or a speech. The live music distribution system includes a mixing board for processing sounds collected from the venue for optimizing the reproduction of sounds. The live music distribution system includes a music codec for transforming the sounds into a media format that is acceptable to the mobile digital media device. The live music distribution system includes a database for storing a registration of the mobile digital media device, the registration allowing the mobile digital media device to receive the distribution of live performances at the venue.

In accordance with further aspects of this invention, another system form of the invention includes a system for digitally distributing live performances. The system comprises means for storing live performances, emitting radio frequency identification information and communicating over a wireless local area network. The system further comprises a means for distributing live performances to the means for storing live performances over the wireless local area network when the presence of the means for storing live performances is detected by the emitted radio frequency identification information and the means for storing live performances is registered to receive the distribution of live performances at a venue. Live performances include music or a lecture. The means for distributing live performances includes a means for processing sounds collected from the venue for optimizing the reproduction of sounds. The means for distributing live performances includes means for transforming the sounds into a media format that is acceptable to the mobile digital media device. The means for distributing live performances includes means for storing a registration of the mobile digital media device, the registration allowing the mobile digital media device to receive the distribution of live performances at the venue.

In accordance with further aspects of this invention, a method form of the invention includes a method for distributing live performances, which comprises registering a mobile digital media device before a live performance at a venue. The act of registering includes interrogating the mobile digital media device for its radio frequency identification serial number. The method further includes detecting the presence of the mobile digital media device at the venue by detecting the emission of the radio frequency identification serial number of the mobile digital media device. The method also includes distributing the live performance to the mobile digital media device via a wireless local area network at the venue if the radio frequency identification serial number of the mobile digital media device matches and is registered by the act of registering. The act of registering optionally includes interrogating the mobile digital media device to determine a public key of the mobile digital media device for encryption. The act of registering includes inputting a wired equivalent privacy key for decryption of the distribution of the live performance. The act of detecting optionally includes encrypting a wired equivalent privacy key with a public key of the mobile digital media device and sending the encrypted wired equivalent privacy key to the mobile digital media device for decryption. The act of distributing includes distributing over a Web site when the mobile digital media device fails to receive the distribution of the live performance over the wireless local area network at the venue.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a block diagram illustrating exemplary components of a mobile digital media device.

DETAILED DESCRIPTION OF THE PREFERRED EMBODIMENT

Figure 1:
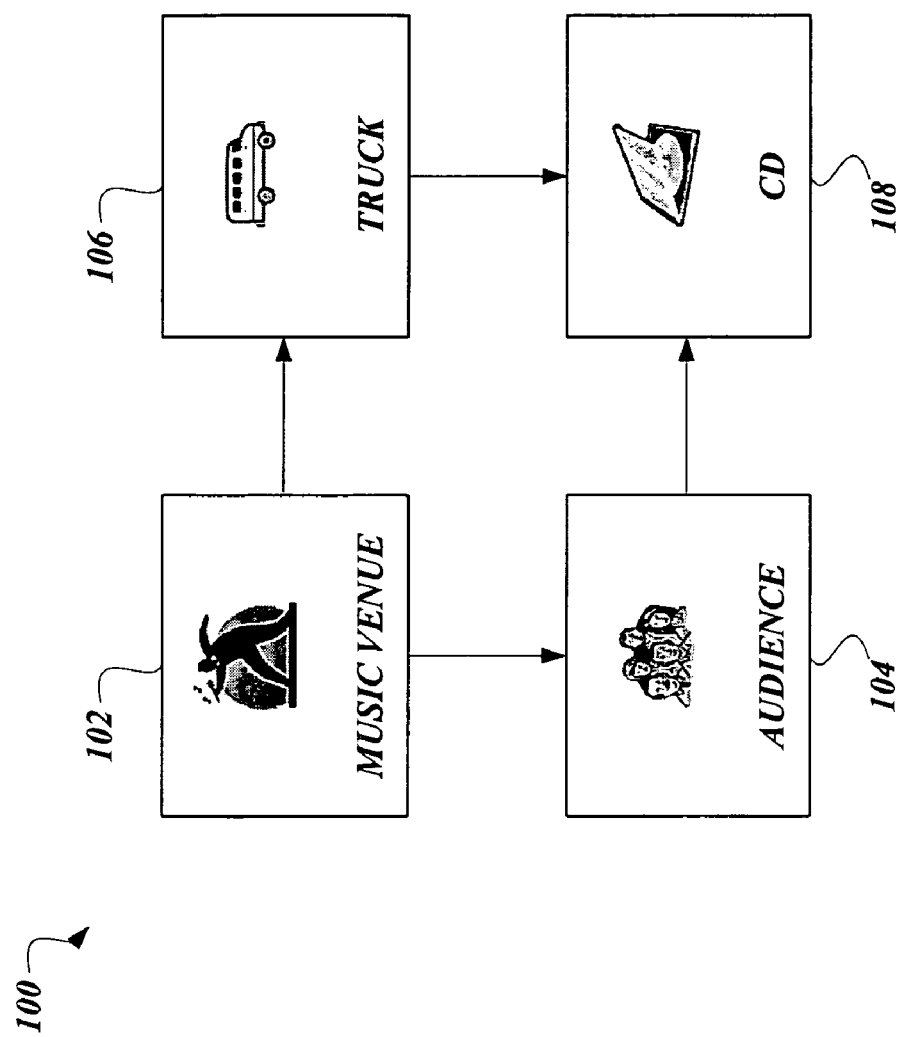
FIG. 1 is a block diagram illustrating a conventional system for distributing recorded live performances on a compact disc.

Various embodiments of the present invention provide an electronic retail system for the distribution of live performances to mobile digital media devices, such as a cellular phone or an Apple iPod, using suitable distribution technologies, such as radio frequency identification (RFID) technology and wireless local area access protocol. Various embodiments of the present invention suitably allow the distribution of live performances automatically by subscription services; pre-purchase services; or user-triggered events, such as a button click. A transaction between a member of the audience having a mobile digital media device and the music venue is possible using various embodiments of the present invention. Prior to the distribution of live performances to mobile digital media devices of members of the audience at a venue, identities of certain members of the audience who are allowed to receive the distribution are authenticated by various embodiments of the present invention. This can be accomplished without the user interactions.

Prior to a live performance, a member of the audience can enter into a service agreement at the time of purchasing the mobile digital media device or much later with a vendor at the venue to obtain the right to receive distribution of the particular live performance. The vendor registers the member of the audience in a sales database. The member of the audience enters the music venue to enjoy the live performance. During the performance, music is picked up by microphones and is sent as media to the mixing board which processes the music to optimize its reproduction through loudspeakers at the music venue and for mobile digital media devices. The optimized music is sent to a music codec where the music is transformed into a desired format. In a hardware form, the music codec can be a dedicated computing machine or a card residing in a computing machine. In a software form, the music codec is a piece of software running on a computing machine, such as a personal computer. One suitable example of the software form of the music codec includes converting a song on a CD into an MP3 media file. Preferably, digital audio signal is sent to an audio PCI card on a computing machine, such as a personal computer, and the digital audio signal is broken into regions and is encoded using a suitable encoding software, such as Windows Media Encoder. The music codec uses one or more access points to broadcast or unicast the music to a mobile digital media device that is registered and therefore is authorized to receive the music. Prior to receiving, the mobile digital media device is authenticated by replying to an RFID query from one or more RFID transponders. The mobile digital media device is authenticated if it is registered with the sales database. If the mobile digital media device is registered, a secure key is sent to the mobile digital media device. The mobile digital media device uses the secure key to decrypt music being broadcasted or unicasted to obtain the distribution of the live performance in the venue.

Figure 2:
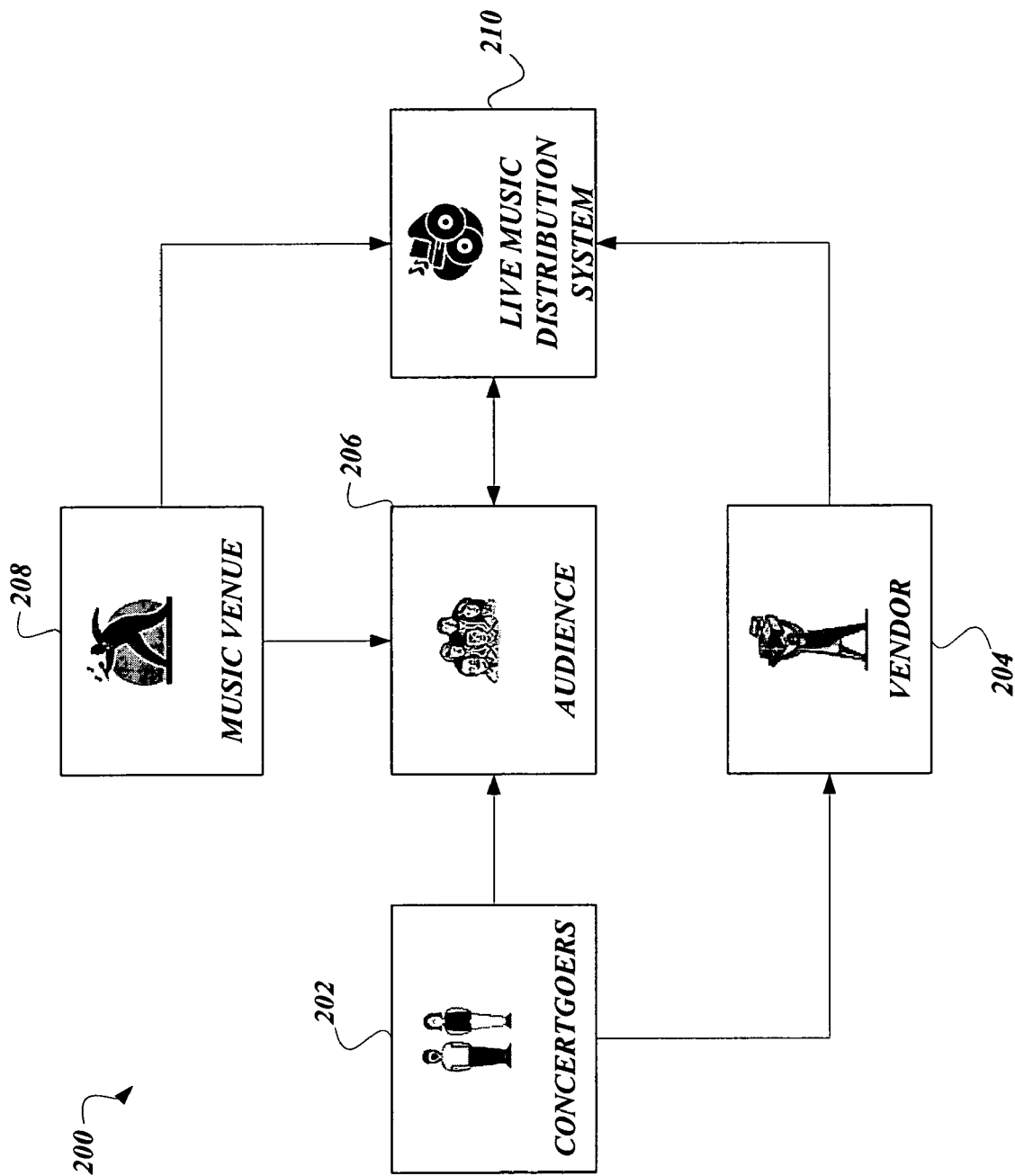
FIG. 2 is a block diagram illustrating an exemplary electronic retail system that incorporates an exemplary live media distribution system.

An exemplary electronic system 200, as shown in FIG. 2, shows that concertgoers 202 approach a vendor 204 to obtain pre-purchase services or to sign up for subscription services for obtaining a distribution of live performances at a music venue 208. This can be obviated if the concertgoers 202 have already executed a service agreement previously, such as at the time the concertgoers 202 purchase the mobile digital media device. The concertgoers 202 may provide to the vendor 204 their tickets as proof of their ability to gain entry to the music venue 208. If the concertgoers 202 also desire to purchase the distribution of live performances at the music venue 208, the concertgoers 202 complete their financial transactions with the vendor 204 to obtain the distribution of live performances. The concertgoers 202 also can specify the data format in which the live performances are to be distributed to them.

The vendor 204 can be a person or a machine, in accordance with various embodiments of the present invention. When the vendor 204 is embodied as a person, preferably the vendor 204 is available within proximity to the music venue 208 where the concertgoers 202 can walk up to the vendor 204 to complete financial transactions to enable the concertgoers 202 to receive the distribution of live performances. For example, the concertgoers 202 may provide cash or a credit card to the vendor 204 as payment for the activation of the ability to receive a distribution of live performances within the music venue 208. When the vendor 204 is embodied as a machine, preferably the vendor 204 is a kiosk or other computing device with user interface screens that enables the concertgoers 202 to specify their desire to receive the distribution of live performances and to specify methods of payment for the distribution of live performances. When payment is duly received from the concertgoers 202, the vendor 204 registers the concertgoers 202 with the live music distribution system 210. The concertgoers 202 then join the audience 206 to enjoy the live performance given at the music venue 208.

Figure 3:
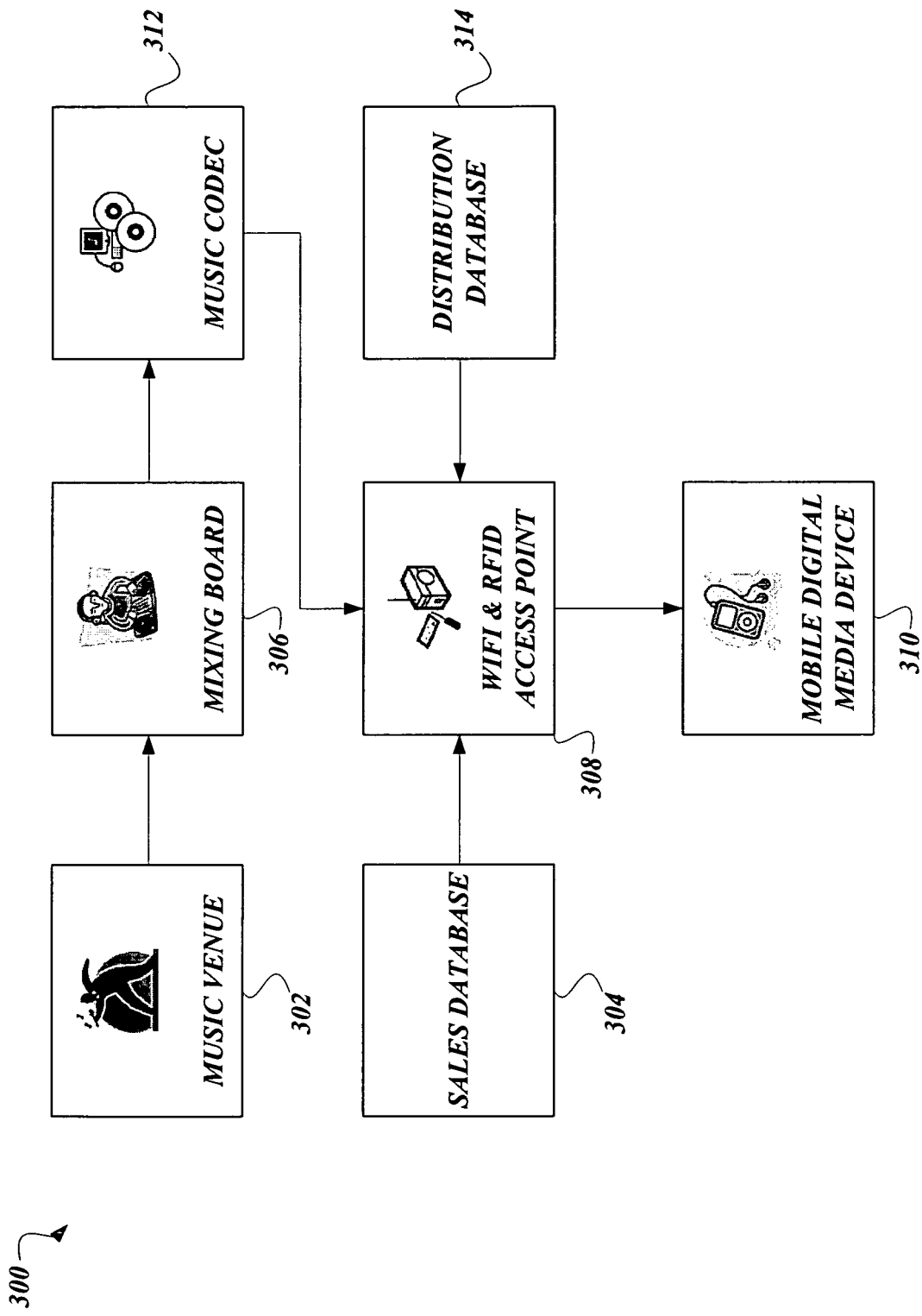
FIG. 3 is a block diagram illustrating an exemplary live media distribution system that incorporates an authentication process to deliver live performances to registered users' mobile digital media devices.
Figure 5A:
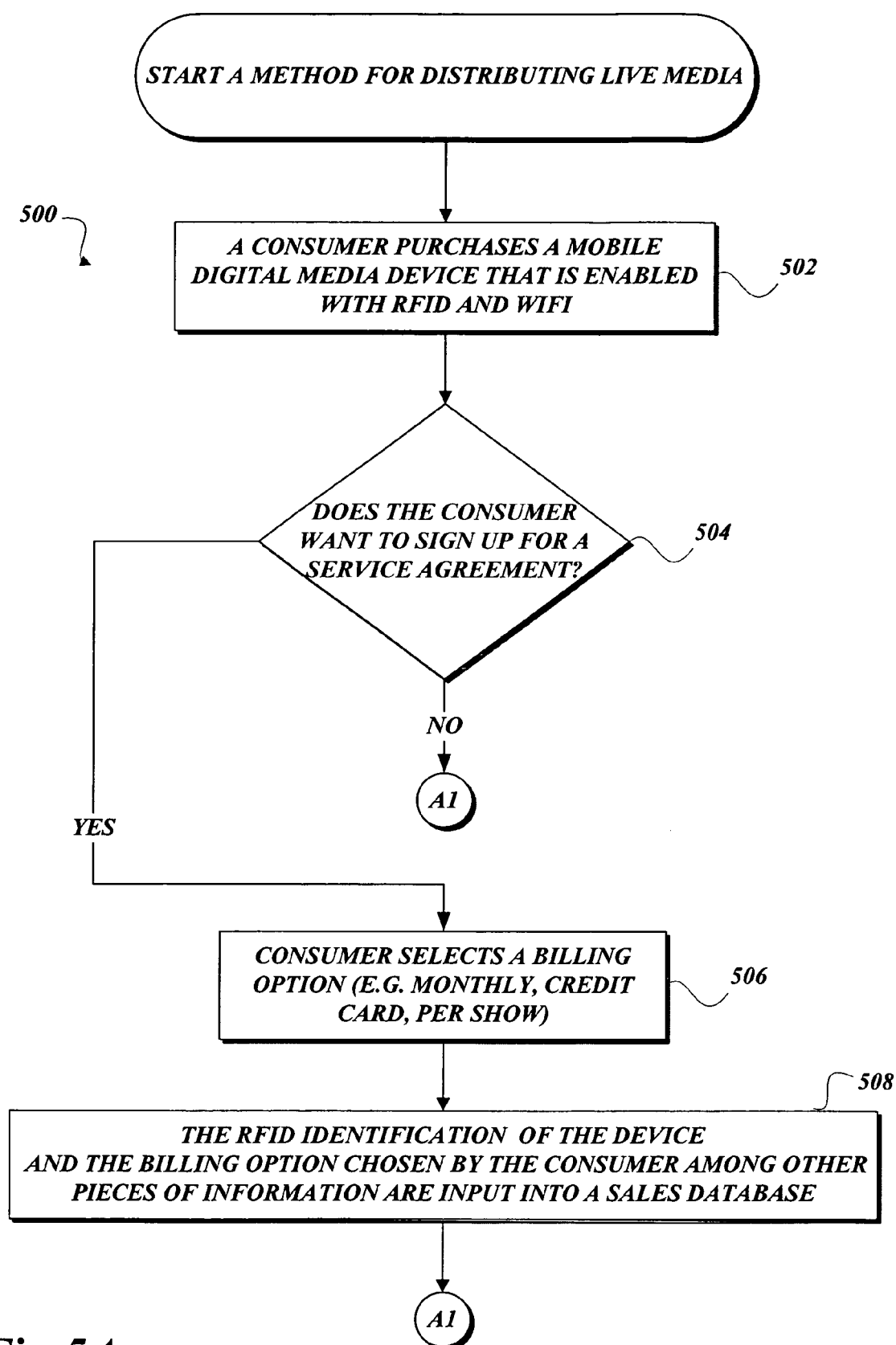
FIGS. 5A-J are process diagrams illustrating a method for distributing live media in accordance with one embodiment of the present invention.
Figure 5B:
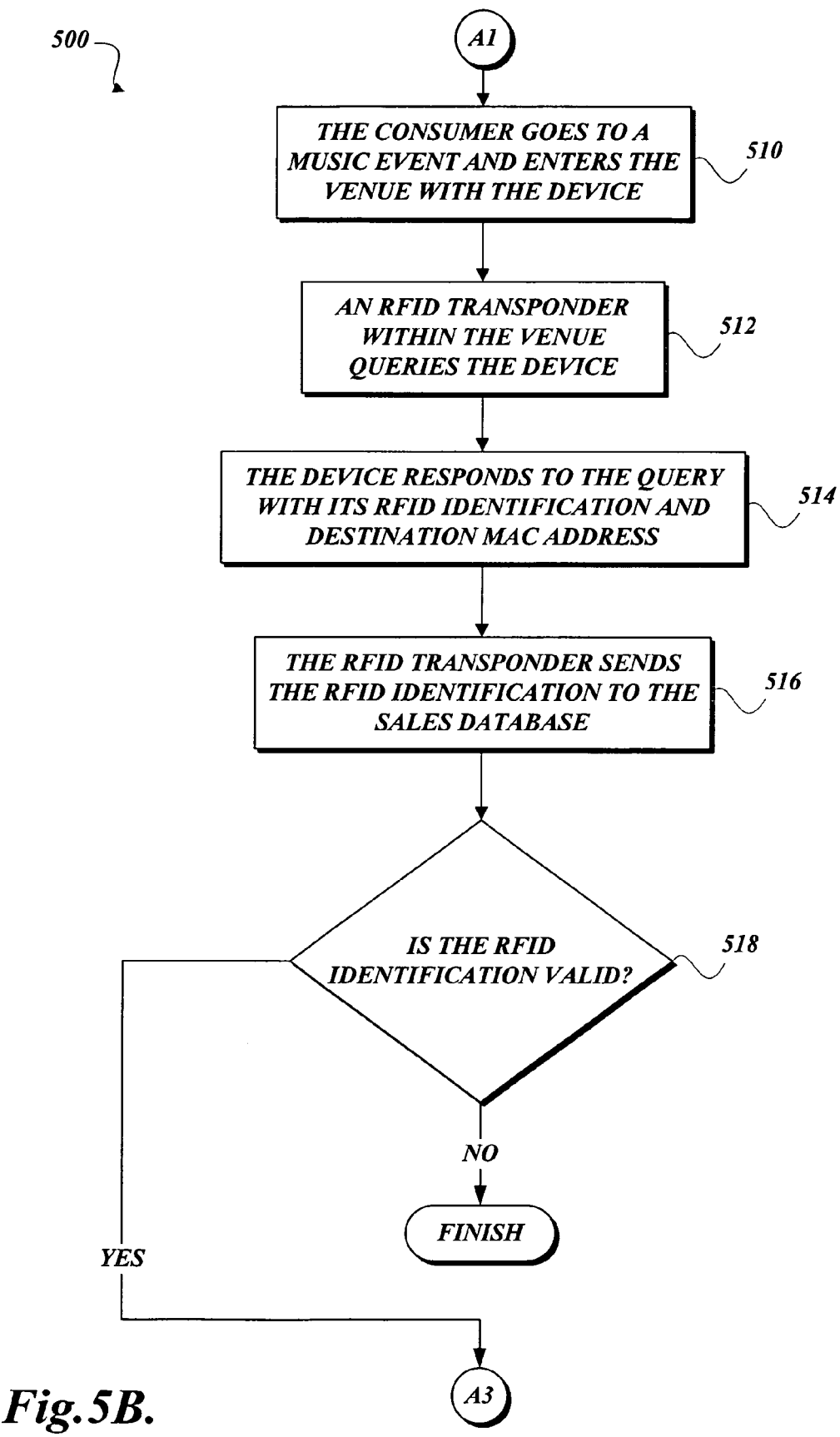
Figure 5C:
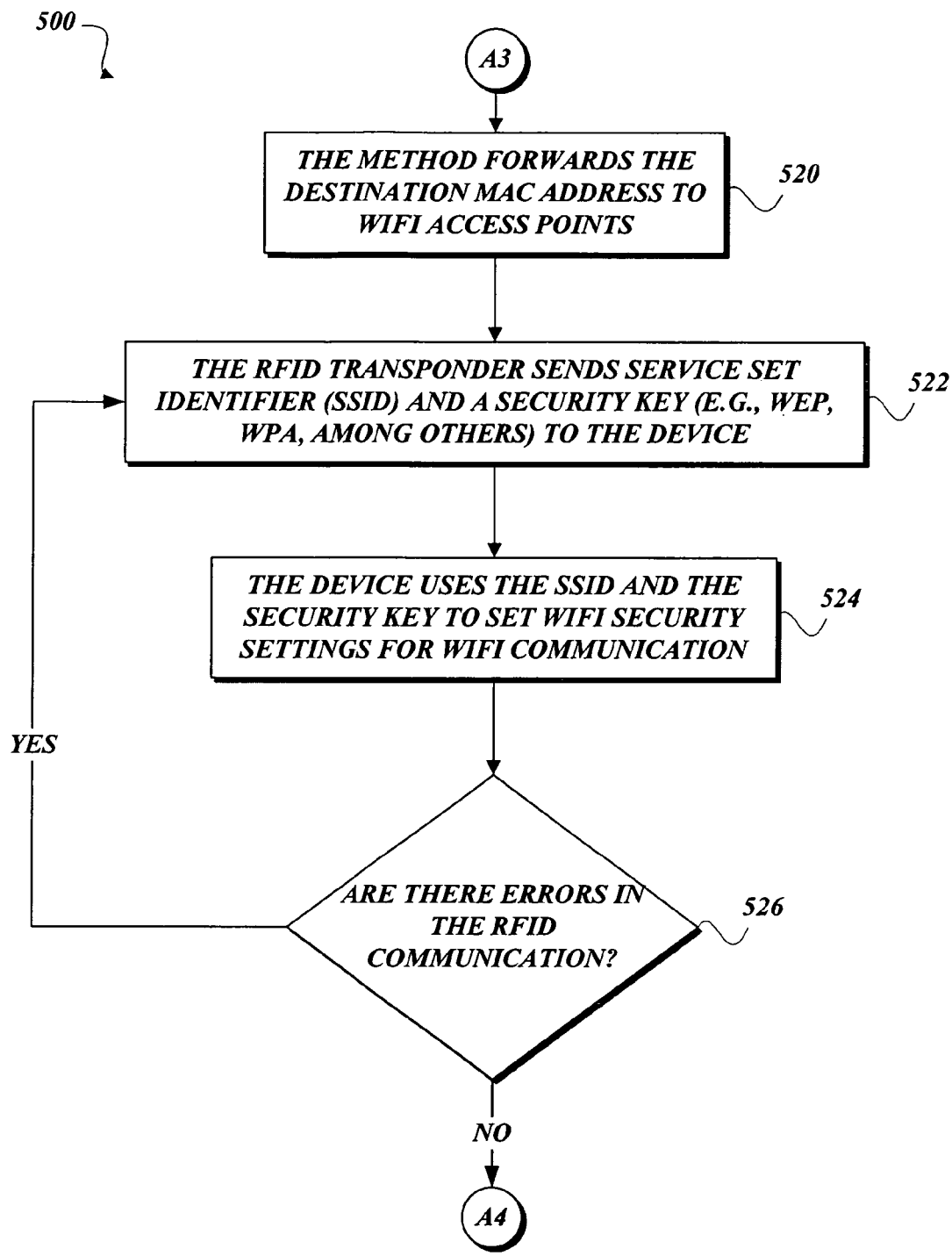
Figure 5D:
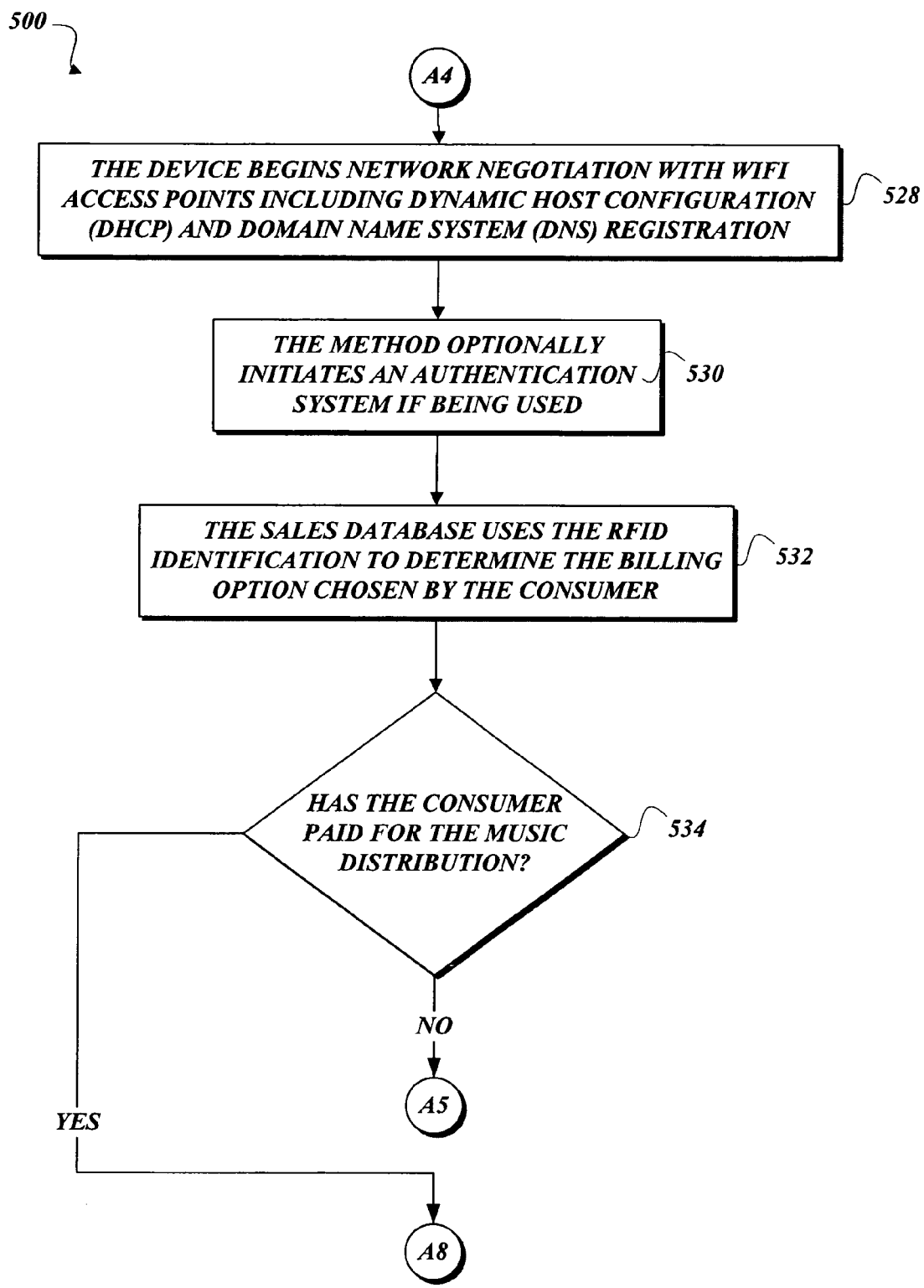
Figure 5E:
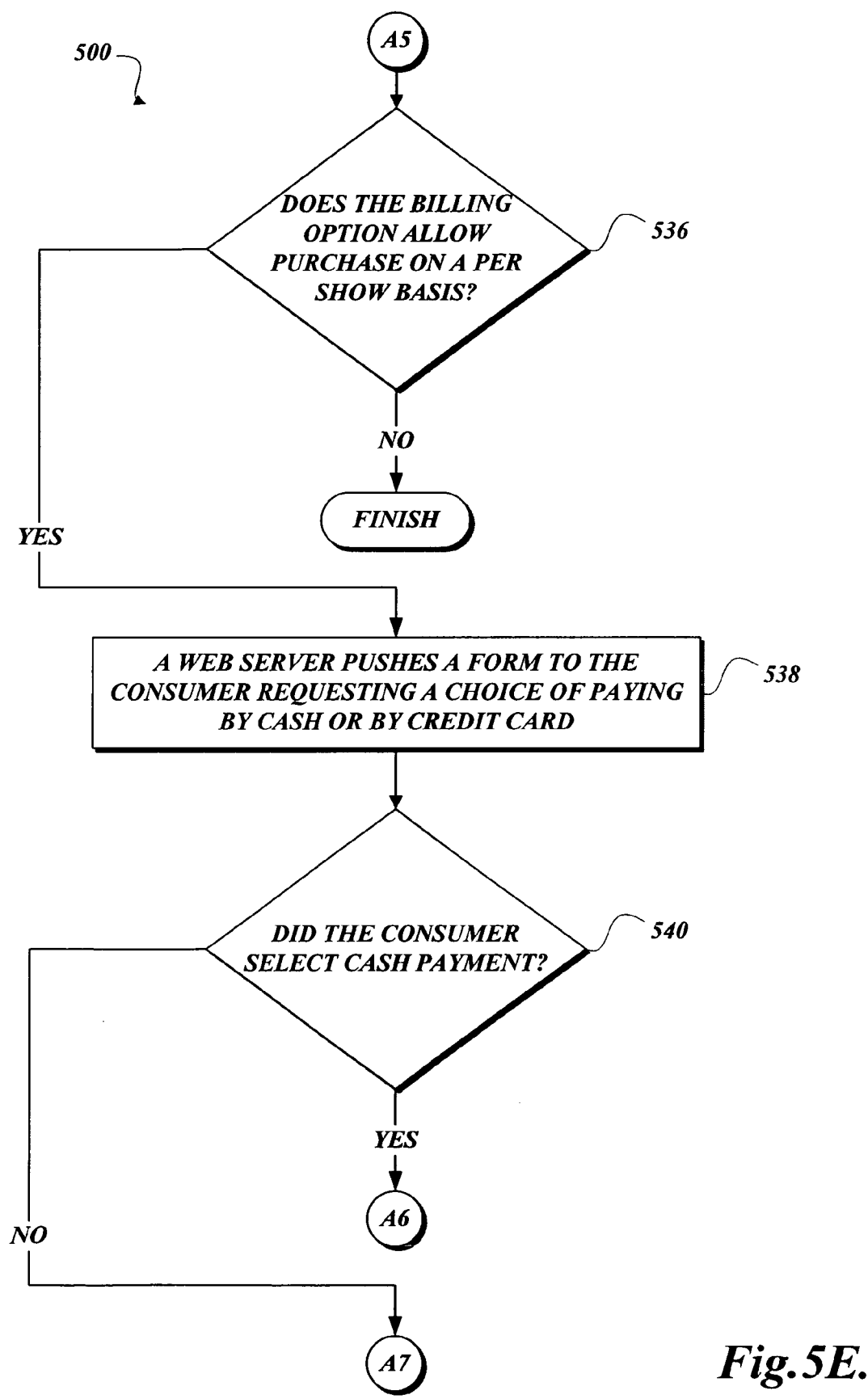
Figure 5F:
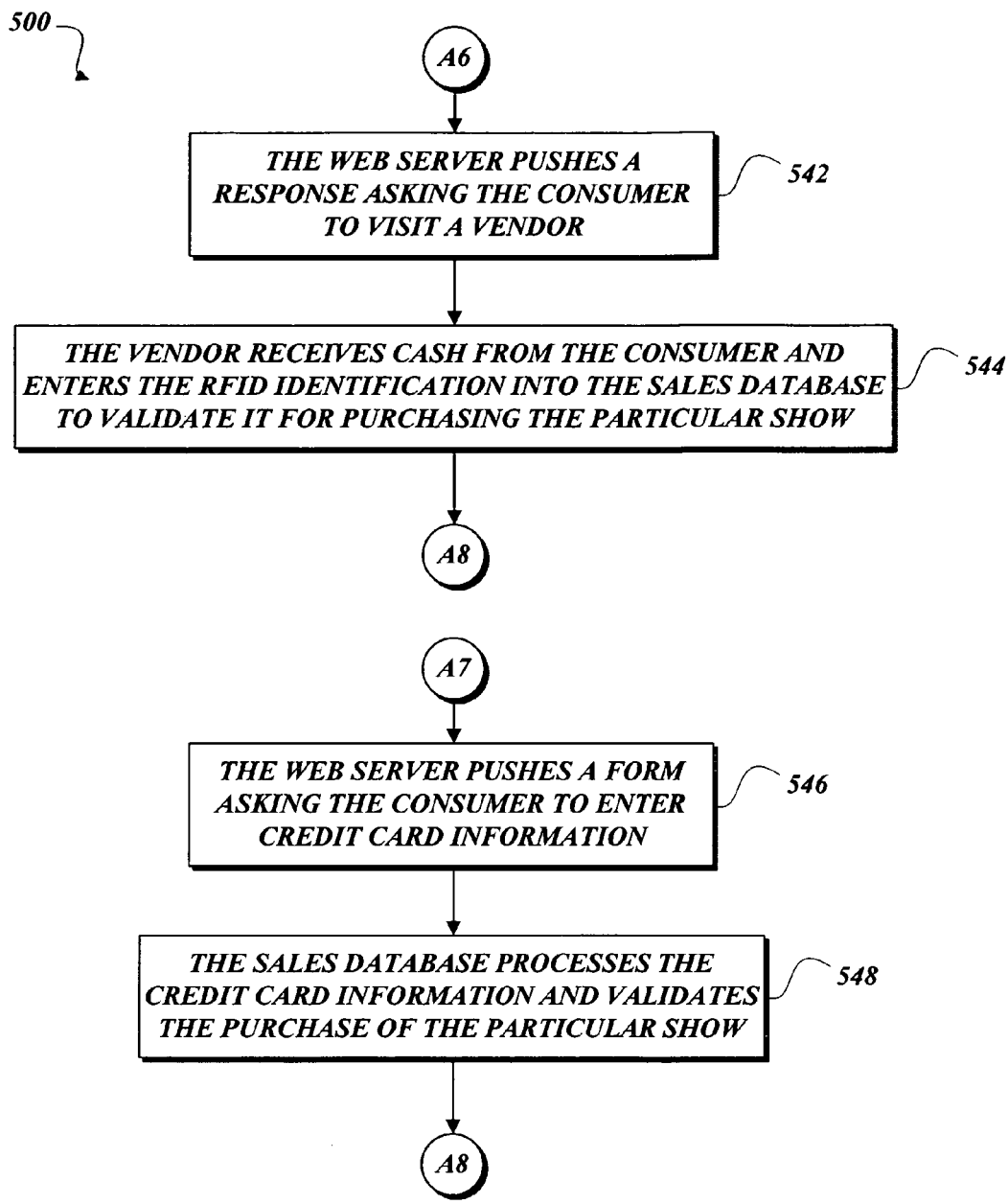
Figure 5G:
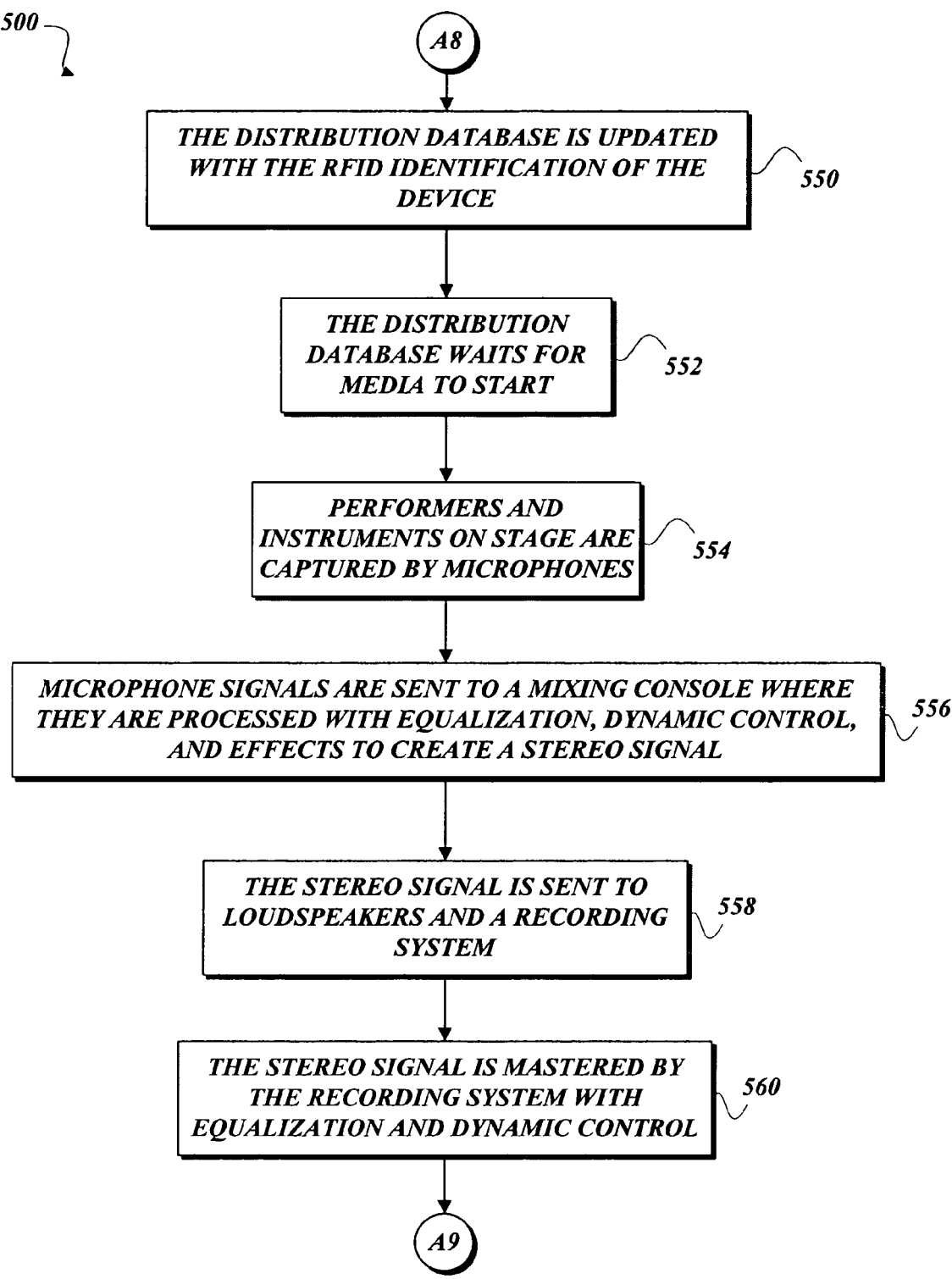
Figure 5H:
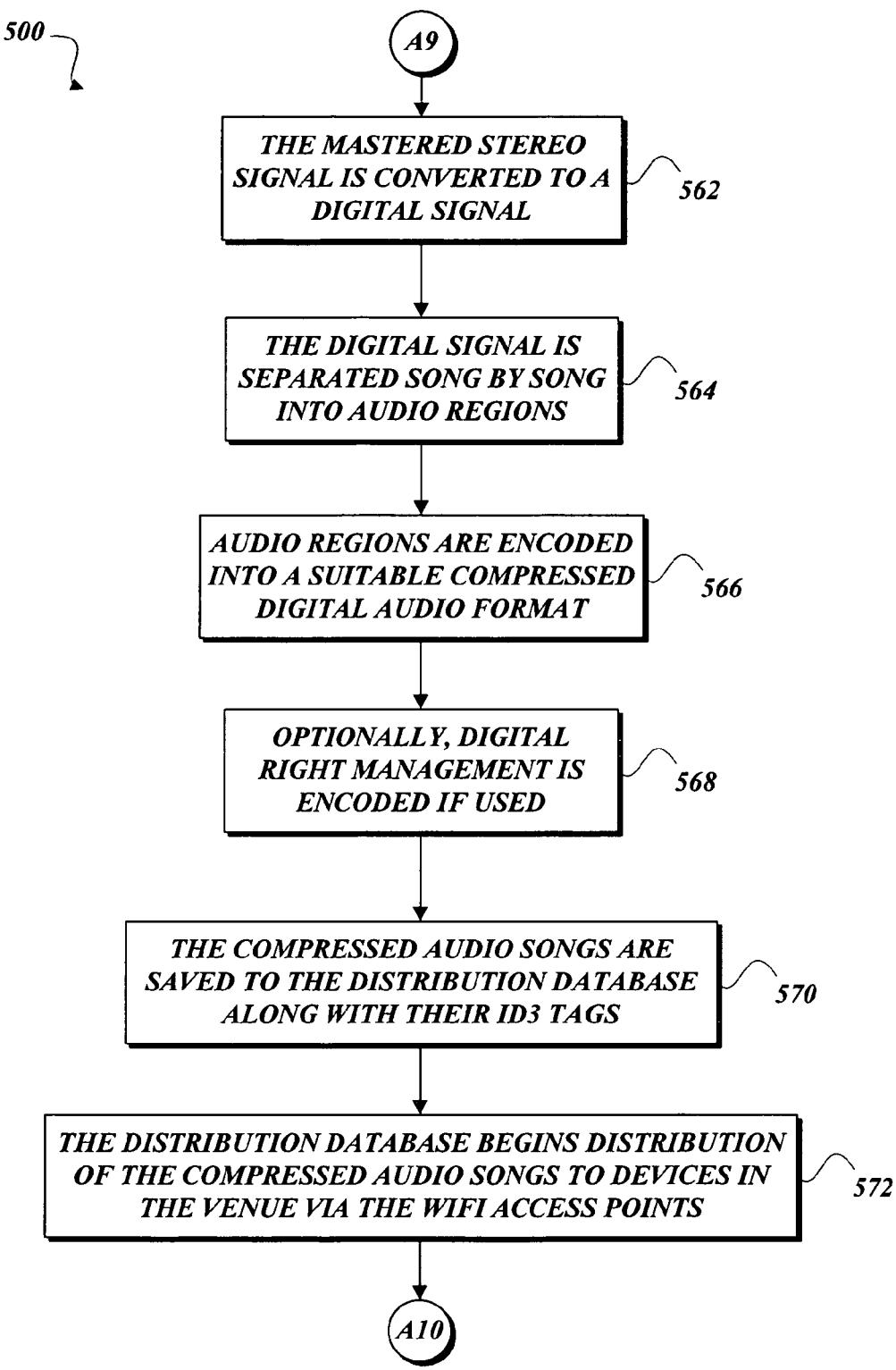
Figure 5I:
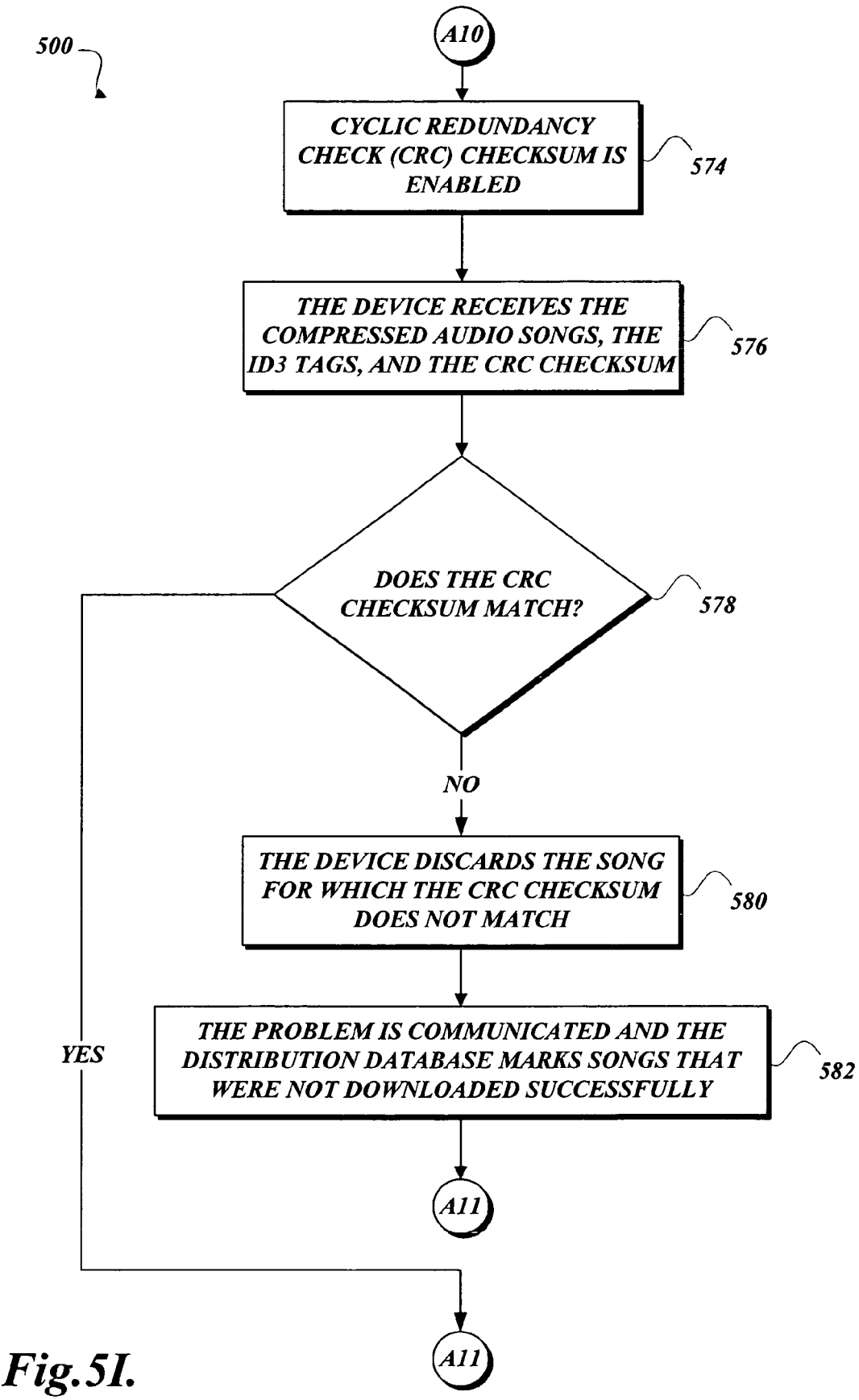
Figure 5J:
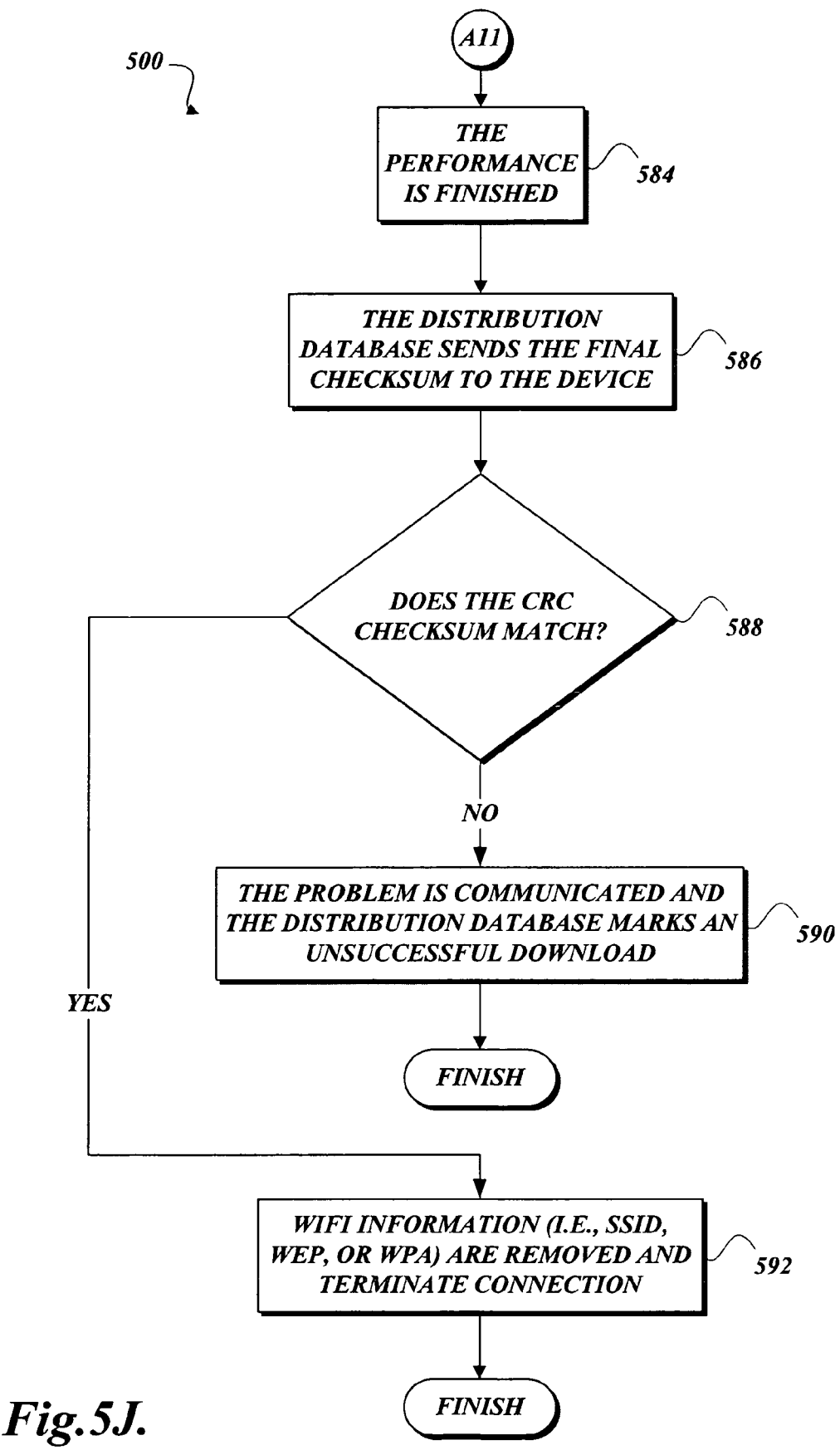

As shown at FIG. 3, microphones (not shown) are placed throughout a music venue 302 to transmit sounds generated on stage from the live performance occurring at the music venue 302. These sounds are sent to a mixing board 306 for clarification, optimization, and amplification before they are reproduced by the loudspeakers at the music venue 302. The operator at the mixing board 306 processes these sounds to create a stereo image for the audience. The operator may opt to master the sounds by performing dynamic control or equalization on the sounds to make it more friendly for both the music venue 302 and the mobile digital media device 310. In various embodiments of the present invention, the output coming from the mixing board 306 is not only directed to the loudspeakers but the output is also directed to a music codec 312. In other words, the microphones are used for both the loudspeakers in the venue but also for the recording process. Preferably, the sound processing for the loudspeakers is separate from the sound processing for the mobile digital media device 310. As would be appreciated by one skilled in the art, it is possible to have a completely different split of the microphone signals going to a separate console and processing for the recordings. Some embodiments of the present invention include a separate stereo feed coming from a console that is mixing for the loudspeakers but the dynamic control and equalization on that stereo signal is separate from the signals being sent to the loudspeakers.

The music codec 312 may be configured as a card for insertion into a slot in a personal computer or it can be a standalone unit mountable on a rack. The music codec 312 converts the output of the microphones into any suitable media formats as specified by the registration stored in a database 304. One suitable media format includes MPEG Audio Layer-3 ("MP3"), a digital audio coding scheme used in distributing recorded music over the Internet. MP3 shrinks the size of an audio file by a factor of 10 to 12 without seriously degrading the quality (CD-recording level) of the sound. MP3 files are given the file extension .mp3.

After the music codec 312 has transformed the output of the mixing board 306 into a media format suitable for a mobile digital media device 310 of a registered member of the audience, the digitized live performances are sent to one or more Wi-Fi access points and RFID transponders 308 where the digitized live performances are broadcast or unicast to one or more mobile digital media devices held by members of the audience at the music venue 302. Wi-Fi is a wireless local area network protocol 802.11b as specified by the Institute of Electrical and Electronic Engineers (IEEE). This wireless local area network protocol allows secure high-speed wireless network access and mobile access to a network infrastructure, such as that at the music venue 302. Until the adoption of Wi-Fi, in order to obtain high-speed network access to a local area network, the networked client needed to be physically connected to the local area network with some type of wiring. RFID is a generic term for technologies that use radio waves to automatically identify mobile digital media devices in the music venue 302. There are several methods of identification, but a preferred method is to store a serial number, which identifies a particular mobile digital media device, on a microchip.

It is preferred that prior to broadcast or unicast by Wi-Fi access points and RFID transponders 308, one or more Wi-Fi access points and RFID transponders 308 detect the presence of the mobile digital media device 310. This detection occurs when the mobile digital media device 310 responds to a query of the RFID transponders 308. A sales database 304 can be consulted by the RFID transponders 308 to authenticate that the mobile digital media device 310 is allowed to receive distribution of live performances at the music venue 302. The sales database 304 preferably receives registration information from the concertgoers 202 or the vendor 204 prior to the live performance at the music venue 302. The sales database 304 receives a unique identification of the mobile digital media device 310 and verifies that the mobile digital media device 310 is registered for receiving recordings of live performances at the music venue 302. It is preferred that the mobile digital media device 310 has suitable wireless networking capability to receive media distribution from a distribution database 314 via one or more Wi-Fi access points 308 at the music venue. One suitable wireless networking protocol that the mobile digital media device 310 can comply with is IEEE 802.11b or 802.11g. Other suitable wireless networking protocols are possible.

FIG. 4 illustrates in greater detail the mobile digital media device 310. There are many hardware and software components that comprise the mobile digital media device 310. These components include CPU, memory, and storage components 406. The CPU is the central processing unit and provides the computational and control functionality of a computer. Memory is a device where information can be stored and retrieved and preferably includes flash upgradeable nonvolatile random access memory to store an operating system, applications, play lists, and so on. Storage is a device on which information can be kept and includes disc drives or external storage media to save downloads. It may include not only an internal hard drive, but removable media such as a compact flash card or memory stick. The mobile digital media device 310 includes LCD screen, keypad, and antenna components 404. The LCD screen is used to display a graphical user interface for consumer interaction. The keypad is preferably an alpha-numeric keypad and allows the consumer to provide input. The antenna is provided for Wi-Fi and RFID communications. One or more USB ports and power components 402 are also available with the mobile digital media device 310. The USB port is used to transfer data to and from the mobile digital media device 310 to other devices, such as a personal computer. The power interface allows the mobile digital media device 310 to refresh the battery level and allow a connection to an external power source. An RFID component 408 is also available, which contains a unique serial number that acts as an RFID identification for the mobile digital media device 310 and additionally provides reading and writing capabilities for storing data and modifying the data. An audio component 410 allows media, such as music, to be played back for reproducing recorded sound. Authentication and security is optionally provided by an optional encrypt and authenticate component 412. The mobile digital media device 310 includes a Wi-Fi component 420 that allows wireless networking capabilities for data transfer. Various standards are available for wireless networking, such as 802.11a, b, or g, among others. An API component 416 provides a set of application programming interfaces for interacting with the Wi-Fi component 420, the RFID component 408, and the encrypt and authenticate component 412, as well as the audio component 410, and so on. The mobile digital media device 310 also includes an embedded operating system 414 which is essentially software that controls the allocation and usage of hardware resources, such as the CPU, memory, and storage component 406, among other components. The operating system is the foundation software on which applications 418 depend to access various components 414-420 of the mobile digital media device 310 and for communication external to the device.

Applications 418 interact with the Wi-Fi component 420, the RFID component 408, and the encrypt and authenticate component 412 to receive a media download. The RFID component 408 allows the mobile digital media device 310 to uniquely identify itself externally, and the RFID component 408 additionally is capable of receiving Wi-Fi networking security settings to ensure the safe receipt of media downloads. The security settings include the destination MAC address of the mobile digital media device 310, Wi-Fi SSID, and Wi-Fi encryption key such as WEP or WPA. The MAC address is part of a MAC frame of a wireless local area network protocol, such as IEEE 802.11g, which indicates, among other things, the destination address of the mobile digital media device 310 which is allowed to receive frames of distribution of live media.

Digressing, Although it is possible for a music venue in which the mobile digital media device 310 operates has a wireless local area network, it is likely that a third party service provider may need to bring into the music venue equipment necessary to distribute the music over the wireless local area network, which has been configured to include several main components: instances of mobile digital media device 310 acting as stations, wireless access points, RFID transponders, basic service sets, and a distribution system. A basic service set is a wireless network, consisting of a single wireless access point supporting one or more mobile digital media devices. The mobile digital media devices communicate through the access points or the RFID transponders. The access point provides connectivity to the wired local area network, whereas the RFID transponders allow connectivity to the RFID component 408. The access points of multiple basic service sets are interconnected by the distribution system. This allows members of the audience to move about because the mobile digital media devices can move from one basic service set to another basic service set while maintaining communication.

It is preferred that various embodiments of the present invention use the infrastructure mode of the wireless local area network protocol. The infrastructure mode defines a service set identifier (SSID), also known as the wireless network name, which identifies the wireless network. The SSID is a name configured on the wireless access point that identifies the wireless network. In infrastructure mode, a mobile digital media device uses a wireless access point to access the resources of a traditionally wired network on which a sales database or a distribution database are coupled. Among the address information that is contained in the MAC frame is the BSS identifier or BSSID. The BSSID uniquely identifies each basic service set operating at a music venue. The BSSID is typically the MAC address of the access point used in various embodiments of the present invention. The WEP key is also known as a wired equivalent privacy key which provides data confidentiality services by encrypting the data sent between wireless nodes. In the MAC frame there is a field to indicate whether a WEP key is used and thereby a determination of whether encryption and authentication is used by the MAC frame. In other words, a WEP key is used to provide data confidentiality services by encrypting the data sent between wireless nodes. Setting a WEP flag in the MAC header of the MAC frame indicates that a frame is encrypted with WEP encryption. WEP provides data integrity by including an integrity check value in the encrypted portion of the wireless frame. It is preferred that either the multicast/global WEP key is used to protect multicast and broadcast traffic from a wireless access point to all of the mobile digital media devices or for a unicast session WEP key to protect unicast traffic between a mobile digital media device and a wireless access point.

An alternative to the WEP key is the Wi-Fi protected access (WPA) standard, which is interim until IEEE 802.11i is ratified. These standards can supplant the use of the WEP key to obtain alternative methods of data encryption and network authentication.

FIGS. 5A-5J illustrate a process 500 for distributing live media, such as music. From a start block, the process 500 proceeds to block 502 where a consumer purchases a mobile digital media device that is enabled with RFID and Wi-Fi. The mobile digital media device can be found at a retail outlet or at a vendor operating at a show. Next, a test is performed to determine whether the consumer wants to sign up for a service agreement. See decision block 504. The service agreement is a contract that obligates the consumer to pay for live media downloading services. The service agreement can be established at the time of purchase of the mobile digital media device. It can also be established by a vendor at a show or at an appropriate Internet Web site. If the answer to the test at decision block 504 is no, the method 500 continues to another continuation terminal ("terminal A1"). If the answer to the test at decision block 504 is yes, the customer selects a billing option. See block 506. There are several billing options available. The consumer can choose a monthly billing plan in which an invoice will be sent to the consumer. Another billing option is for the consumer to provide credit card information, which is stored on the sales database. These two options allow the consumer to easily purchase live performance media from a show at a particular venue. Another billing option is for the consumer to provide credit card information at the time of the live performance at a particular venue. For this particular billing option, credit card information is entered into the mobile digital media device by the consumer and is communicated to the sales database via the wireless local area network through one or more Wi-Fi access points. Another billing option is for the user to purchase media of each live performance individually on a cash basis. In this case, when the consumer is at a venue enjoying a live performance, the mobile digital media device can direct the consumer to talk to a vendor at the venue for a payment transaction. The vendor would typically get the RFID identification of the mobile digital media device and communicate the information to the sales database so as to allow the consumer to begin receiving media of the live performance at the venue. Next, at block 508, the RFID identification of the mobile digital media device and the billing option chosen by the consumer, among other pieces of information, are input into a sales database. The method 500 then continues to terminal A1.

From terminal A1 (FIG. 5B), the consumer goes to a music event and enters the venue with the mobile digital media device. See block 510. Next, at block 512, an RFID transponder within the venue queries the mobile digital media device. If the mobile digital media device is not powered up, preferably the RFID chip within the device wakes the device for responding to the queries from the RFID transponder. The device responds to the query with its RFID identification and destination MAC address. See block 514. Next, at block 516, the RFID transponder sends the RFID identification to the sales database. The RFID transponder constantly monitors for RFID devices and it also actively listens for replies to its queries. A test is performed at decision block 518 to determine whether the RFID identification in the sales database is valid. If the answer to the test at decision block 518 is no (in other words, the RFID identification is not among the identifications of mobile digital media devices registered to receive a download of the live performance), the method terminates execution and no further RFID communications with the mobile digital media device will occur. If the answer to the test at decision block 518 is yes (in other words, the mobile digital media device is registered and it is authorized to receive a download of a live performance), the method 500 continues to another continuation terminal ("terminal A3").

From terminal A3 (FIG. 5C), the method forwards the destination MAC address to Wi-Fi access points. See block 520. The Wi-Fi access points store the destination MAC address of the mobile digital media device for subsequent communication. Next, at block 522, the RFID transponder sends a service set identifier (SSID) and a security key (such as WEP, or WPA, among others) to the mobile digital media device. The method 500 then continues to block 524 where the mobile digital media device uses the SSID and the security key to set Wi-Fi security settings for Wi-Fi communication. At decision block 526, a test is performed to determine whether there were any errors in the RFID communication. If the answer to the test at decision block 526 is yes, the method 500 loops back to block 522 where the above-identified processing steps are repeated. Otherwise, if the answer to the test at decision block 526 is no, the method 500 continues to another continuation terminal ("terminal A4").

From terminal A4 (FIG. 5D), the mobile digital media device begins network negotiation with Wi-Fi access points including dynamic host configuration (DHCP) and domain name system (DNS) registration. See block 528. Next, at block 530, the method optionally initiates an authentication system being used. The sales database uses the RFID identification as a key to determine the billing option chosen by the consumer. A test is performed at decision block 534 to determine whether the consumer has paid for the music distribution of the live performance. If the answer to the test at decision block 534 is no, the method 500 proceeds to another continuation terminal ("terminal A5"). Otherwise, if the answer to the test at decision block 534 is yes, the method proceeds to also another continuation terminal ("terminal A8"). The sales database communicates with the mobile digital media device through a centralized Web server. The Web server provides Web pages acting as a user interface for the consumer to interact with to confirm music selection or payment information. For example, if the consumer has previously agreed to provide credit card information or monthly billing plan, the sales database through the Web server presents a screen for the user to indicate that the consumer desires to download the music distribution for the particular live performance that is occurring at a venue.

From terminal A5 (FIG. 5E), the method 500 proceeds to a test performed at decision block 536 to determine whether the billing option allows purchase by the consumer on a per show basis. If the answer is no to the test at decision block 536, the method terminates execution. Otherwise, if the answer to the test at decision block 536 is yes, at block 538, a Web server pushes a form or other tag-based pages to the consumer's mobile digital media device requesting a choice of paying by cash or by credit card. A test is performed at decision block 540 to determine whether the consumer selected a cash payment. If the answer to the test at decision block 540 is yes, the method proceeds to another continuation terminal ("terminal A6"). If the answer to the test at decision block 540 is no, however, the method 500 proceeds to another continuation terminal ("terminal A7").

From terminal A6 (FIG. 5F), the Web server pushes a response in the form of a Web page asking the consumer to visit a vendor within proximity to the venue. See block 542. Next, at block 544, the vendor receives cash from the consumer and enters the RFID identification of the mobile digital media device of the consumer into the sales database so as to validate it for purchasing media of the particular show being performed at the venue. The method 500 then continues to terminal A8.

From terminal A7 (FIG. 5F), the method proceeds to block 546, where the Web server pushes a form created from a tag-based language, such as HTML or XML, asking the consumer to enter credit card information. Sensitive financial information provided to various embodiments of the present invention can be securely communicated via suitable means of encryption. One suitable means includes secure socket layers (SSL), which is a protocol developed to ensure security and privacy in Internet communications. The method 500 then continues to block 548 where the sales database processes the credit card information and validates the purchase of the media for a particular show. The method 500 then continues to terminal A8.

From terminal A8 (FIG. 5G), the method 500 proceeds to block 550 where the distribution database is updated with the RFID identification of the mobile digital media device to indicate that it can receive music distribution. Next, at block 552, the distribution database waits for the media to become available. In other words, the distribution database waits until there are recorded media in the database for it to distribute to the mobile digital media device, and then it distributes the media as the performance occurs. Performers and instruments on stage are captured by microphones. Microphone signals are sent to a mixing console where they are processed with equalization, dynamic control, and other effects to create a stereo signal. See block 556. At block 558, the stereo signal is sent to loudspeakers in a recording system. The loudspeakers reproduce a sound for the members of the audience to enjoy at the venue. The recording system is one among a number of components for processing the stereo signal for distribution to the mobile digital media device. The stereo signal is mastered by the recording system with equalization and dynamic control at block 560. The method 500 then proceeds to another continuation terminal (terminal A9).

From terminal A9 (FIG. 5H), the method 500 proceeds to block 562 where the mastered stereo signal is converted to a digital signal. Next, at block 564, the digital signal is separated song-by-song into audio regions. The audio regions are encoded into a suitable compressed digital audio format. See block 566. Optionally, at block 568, digital rights management can be encoded into the compressed audio if used. At block 570, the compressed audio songs are saved to the distribution database along with metadata (e.g., ID3 tags). Some metadata includes the name of the song, the artist, the composer, and so on. The method 500 proceeds to block 572 where the distribution database begins distributing the compressed audio songs to the mobile digital media device in the venue via one or more Wi-Fi access points. The method 500 continues at another continuation terminal ("terminal A10").

From terminal A10 (FIG. 5I), cyclic redundancy check (CRC) check sum is enabled. See block 574. At block 576, the mobile digital media device receives the compressed audio songs, the metadata, and the CRC check sum. A test is performed at decision block 578 to determine whether the CRC check sum matches. If the answer is yes to the test at decision block 578, the method 500 continues to another continuation terminal ("terminal A11"). If the answer to the test at decision block 578 is no, the method 500 proceeds to block 580 where the mobile digital media device discards the song for which the CRC check sum does not match. At block 582, the problem is communicated with the distribution database and the distribution database marks songs that were not downloaded successfully. The method 500 then continues to terminal A11.

From terminal A11 (FIG. 5J), the live performance is finished. See block 584. At block 586, the distribution database sends the final check sum to the mobile digital media device. A test is performed at decision block 588 to determine whether the final CRC check sum matches. If the answer is no to the test at decision block 588, the problem is communicated to the distribution database and the distribution database marks that none of the songs were successfully downloaded to the mobile digital media device. See block 590. The consumer can subsequently go to a particular Web site for final media retrieval given the problem of downloading at the venue. The method then terminates execution. If the answer to the test at decision block 588 is yes, the method 500 continues to block 592 where the Wi-Fi information (such as SSID, WEP, or WPA key) is removed and the connection to the wireless local area network is terminated. The method 500 then terminates execution.

There are at least four layers of communication used by various embodiments of the present invention. The first layer includes RFID communication which initiates the distribution of live performance by validating a unique identifier connected with the mobile digital media device and negotiates initial Wi-Fi security settings between the mobile digital media device and the music distribution system. The second layer is a Wi-Fi communication layer to support subsequent data transport or downloading of songs or other media to the mobile digital media device. The Wi-Fi communication occurs through TCP/IP, and radio frequency security measures such as using the Wi-Fi SSID, the WEP key or the WPA key. The third layer is entirely optional and is the authentication layer that could be based on a PKI model, IP SEC for file encryption or digital signatures, and so on. The fourth layer includes the application layer which provides a Web interface to the Web server for financial transactions and media streaming. The use of SSL ensures security for transport of data between the Web server, the sales database, the distribution database, and the mobile digital media device, such as financial information, and credit card information.

While the preferred embodiment of the invention has been illustrated and described, it will be appreciated that various changes can be made therein without departing from the spirit and scope of the invention. For example, a lecture is considered to be a live performance that can be distributed by various embodiments of the present invention. In other words, the term "live performance" includes any public presentation in which audio can be recorded and distributed contemporaneously to a mobile digital media device via a wireless local area network.

The embodiments of the invention in which an exclusive property or privilege is claimed are defined as follows:

1. A live music distribution system, comprising:
    a mobile digital media device which includes an RFID component which emits an RFID serial number and receives networking security settings, the mobile digital media device further including a wireless networking component which communicates over a wireless local area network;
    A mixing board processing sounds collected from a venue where live performances are being carried out;
    a music codec stored on a computer-readable medium, which computer-executable instructions being actable for transforming the sounds into a media format that is acceptable to the mobile digital media device;
    A database storing a registration of the mobile digital media device, the registration allowing the mobile device to receive the distribution of live performances at a venue where live performances are being carried out;
    At least a hardware component distributing live performances to the mobile digital media device over the wireless local area network when the presence of the mobile digital media device is detected by the emitted RFID serial number and the mobile digital media device is registered to receive the distribution of live performances at a venue where live performances are being carried out.

2. The system of claim 1, wherein live performances include music or a lecture.

3. A system for digitally distributing live performances, comprising:
    means for storing live performances, emitting an RFID serial number and communicating over a wireless local area network; and
    means for distributing live performances to the means for storing live performances at a venue where live performances are being carried out over the wireless local area network when the presence of the means for storing live performances is detected by the emitted RFID serial number and the means for storing live performances is registered to receive the distribution of live performances at the venue where live performances are being carried out.

4. The system of claim 3, wherein live performances include music or a lecture.

5. The system of claim 3, wherein the means for distributing live performances includes a means for processing sounds collected from the venue for optimizing the reproduction of sounds.

6. The system of claim 3, wherein the means for distributing live performances includes means for transforming the sounds into a media format that is acceptable to the mobile digital media device.

7. The system of claim 3, wherein the means for distributing live performances includes means for storing a registration of the mobile digital media device, the registration allowing the mobile digital media device to receive the distribution of live performances at the venue.

8. A method for distributing live performances, comprising:
    registering a mobile digital media device before a live performance at a venue, the act of registering including interrogating the mobile digital media device for its radio frequency identification serial number;
    detecting the presence of the mobile digital media device at the venue by detecting the emission of the radio frequency identification serial number of the mobile digital media device; and
    distributing the live performance to the mobile digital media device via a wireless local area network at the venue, if the radio frequency identification serial number of the mobile digital media device matches and is registered by the act of registering.

9. The method of claim 8, wherein the act of registering includes interrogating the mobile digital media device to determine a public key of the mobile digital media device for encryption.

10. The method of claim 8, wherein the act of registering includes inputting a wired equivalent privacy key for decryption of the distribution of the live performance.

11. The method of claim 8, wherein the act of detecting includes encrypting a wired equivalent privacy key with a public key of the mobile digital media device and sending the encrypted wired equivalent privacy key to the mobile digital media device for decryption.

12. The method of claim 8, wherein the act of distributing includes distributing over a Web site when the mobile digital media device fails to receive the distribution of the live performance over the wireless local area network at the venue.

13. A computer-readable medium having computer-executable instructions stored thereon for implementing a method for distributing live performances, comprising:
    prior to receiving a media distribution, replying to an RFID query from one or more RFID transponders at a venue by an RFID chip on a mobile digital media device; and sending a secure key via the RFID chip to the mobile digital media device to decrypt the media distribution sent over a wireless local area network to obtain the distribution of live performances at the venue where live performances are being carried out.

14. The computer-readable medium of claim 13, further comprising waking the mobile digital media device for responding to the RFID query from the one or more RFID transponders if the mobile digital media device is not powered up.

15. The computer-readable medium of claim 13, wherein sending a secure key includes sending a service set identifier to the mobile digital device so as to set security settings for communication.

16. The computer-readable medium of claim 15, wherein replying includes validating a unique identifier connected with the mobile digital media device.

17. The computer-readable medium of claim 15, further comprising identifying the mobile digital media device by a serial number stored on the mobile digital media device.

* * * * *

UNITED STATES PATENT AND TRADEMARK OFFICE
CERTIFICATE OF CORRECTION

PATENT NO. : 7,693,978 B2  Page 1 of 1
APPLICATION NO. : 11/185630
DATED : April 6, 2010
INVENTOR(S) : B. Eliason et al.

It is certified that error appears in the above-identified patent and that said Letters Patent is hereby corrected as shown below:

| | | |
|---|---|---|
| 11 (Claim 1, | 47 line 47) | "A mixing board" should read --a mixing board-- |
| 11 (Claim 1, | 53 line 53) | "A database storing" should read --a database storing-- |
| 11 (Claim 1, | 54-55 lines 54-55) | "allowing the mobile device" should read --allowing a mobile digital media device-- |
| 11 (Claim 1, | 56 line 56) | "a venue where live performances" should read --the venue where live performances-- |
| 11 (Claim 1, | 57 line 57) | "At least a hardware" should read --at least a hardware-- |
| 11 (Claim 1, | 62-63 lines 62-63) | "live performances at a venue" should read --live performances at the venue-- |

Signed and Sealed this

Third Day of August, 2010

David J. Kappos
*Director of the United States Patent and Trademark Office*